United States Patent
Song et al.

(10) Patent No.: US 7,215,331 B2
(45) Date of Patent: May 8, 2007

(54) TOUCH PANEL

(75) Inventors: In Duk Song, Kumi-shi (KR); Yong Ik Bang, Tacgu-kwangyokshi (KR); Hwan Seong Yu, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 294 days.

(21) Appl. No.: 10/284,476

(22) Filed: Oct. 31, 2002

(65) Prior Publication Data

US 2003/0095111 A1 May 22, 2003

(30) Foreign Application Priority Data

Nov. 14, 2001 (KR) .......................... P 2001-70762
Apr. 23, 2002 (KR) .......................... P 2002-22271

(51) Int. Cl.
*G09G 5/00* (2006.01)
(52) U.S. Cl. .................... 345/173; 178/18.01
(58) Field of Classification Search ................ 345/173, 345/174; 178/18.01, 18.03
See application file for complete search history.

(56) References Cited

U.S. PATENT DOCUMENTS

| 4,587,378 | A | * | 5/1986 | Moore | ......................... 345/173 |
|---|---|---|---|---|---|
| 5,329,291 | A | * | 7/1994 | Chen | ......................... 345/157 |
| 5,750,940 | A | | 5/1998 | Ito et al. | |
| 5,844,175 | A | | 12/1998 | Nakanishi et al. | |
| 5,883,148 | A | * | 3/1999 | Lewandowski et al. | ........ 522/95 |
| 6,147,313 | A | * | 11/2000 | Aiba | ......................... 178/18.03 |
| 6,504,530 | B1 | * | 1/2003 | Wilson et al. | ............... 345/173 |
| 6,522,322 | B1 | * | 2/2003 | Maeda et al. | ................ 345/173 |
| 6,690,361 | B1 | * | 2/2004 | Kang et al. | .................. 345/173 |

FOREIGN PATENT DOCUMENTS

| JP | 8203382 | 9/1996 |
|---|---|---|
| JP | 10312244 | 11/1998 |
| JP | 11219259 | 8/1999 |
| JP | 2000029611 | 1/2000 |
| JP | 2000-284913 | 10/2000 |

* cited by examiner

*Primary Examiner*—Amr A. Awad
*Assistant Examiner*—Steven Holton
(74) *Attorney, Agent, or Firm*—McKenna Long & Aldridge LLP

(57) ABSTRACT

A touch panel includes first and second substrates. Each substrate includes an extension formed at one side thereof, first and second transparent electrodes on each of the surfaces of the first and second substrates facing each other, and a signal line bonded to the transparent electrodes at the extension, for applying a signal to each transparent electrode.

20 Claims, 10 Drawing Sheets

TOUCH PANEL

The present invention claims the benefit of the Korean Application Nos. P2001-70762 filed on Nov. 14, 2001, and P2002-22271 filed on Apr. 23, 2002, which are hereby incorporated by reference for all purposes as if fully set forth herein.

BACKGROUND OF THE INVENTION

1. Field of the Invention

The present invention relates to a touch panel, and more particularly, to a structure of a touch panel formed over a liquid crystal display panel.

2. Discussion of the Related Art

In order to more efficiently use various electronic machines, touch panels have generally been used to input signals on display surfaces, thereby eliminating additional remote controllers or other input devices. Touch panels are widely integrated with display surfaces of flat display devices such as electronic calculators, liquid crystal display (LCD) devices, plasma display panel (PDP) devices, electroluminescence (EL) devices, and cathode ray tubes (CRTs). By integrating touch panels with display devices, it is possible for a user to select desired information while watching an image displayed by the display device.

Capable of sensing when a user touches a display surface, touch panels may be classified into analog resistive, digital resistive, capacitive, saw, and infrared type touch panels.

Generally, touch panels are provided with upper and lower transparent substrates, each having upper and lower electrodes formed thereon, respectively. The upper and lower transparent substrates may be bonded to each other within a predetermined space.

If a surface of the upper transparent substrate is touched at a predetermined point using input means, e.g., a finger, a pen, etc., the upper electrode formed on the upper transparent substrate electrically connects to the lower electrode formed on the lower transparent substrate. A voltage, made variable by a resistance value or a capacitance value of the touched point, is then detected and outputted along with a location defined by coordinates of the touched point.

The touch panel described above is generally manufactured such that it is larger than the display device it is to be combined with. In integrating a display device such as an LCD with a touch panel, however, the size of the touch panel must be adjusted to correspond to the size of the LCD so that a dead space region of the touch panel is smaller than a liquid crystal margin of the LCD. Accordingly, integrating LCDs with touch panels generates a problem in manufacturing process steps.

A related art touch panel capable of being integrated with an LCD will now be explained with reference to the drawings described below.

FIG. 1 illustrates a plane view of a related art touch panel. FIG. 2 illustrates a sectional view of the related art touch panel taken along line I–II' shown in FIG. 1. FIG. 3 illustrates a sectional view of the related art touch panel taken along line II–II' shown in FIG. 1. FIG. 4 illustrates a sectional view of the related art touch panel taken along line III–III' shown in FIG. 1. FIG. 5A illustrates a layout of an upper substrate of the related art touch panel shown in FIG. 1. FIG. 5B illustrates a layout of a lower substrate of the related art touch panel shown in FIG. 1.

In related art LCDs integrated with touch panels, touch panels are formed on display surfaces of display devices so that the touch panels may be used as a means for inputting signals on the display surface.

Referring to FIG. 1, a related art touch panel capable of being integrated with an LCD includes a viewing area V/A and a dead space region 20.

The viewing area is corresponds to the display surface of the display device and is surrounded by the dead space region. The upper and lower transparent substrates are bonded to each other via an insulating sealant provided in the dead space region 20.

Generally, the upper and lower transparent substrates comprise two opposing rectangular upper and lower substrates made out of a material having flexibility and transparency, e.g., polyethylene terephthalate (PET). The upper and lower transparent electrodes are formed on the opposing surfaces of the upper and lower PET substrates, respectively. The upper and lower PET substrates are spaced apart and bonded via an insulating sealant provided in the dead space region 20.

Accordingly, if a predetermined area of the upper substrate is touched with a pen or a finger, the transparent electrodes are also electrically connected to each other at the predetermined area so that a voltage, made variable by a resistance or a capacitance value of the touched point, is detected and outputted. In order to detect the voltage value outputted by the resistance value or the capacitance value at the predetermined area, a signal line connected to the upper transparent electrode in the dead spacer region 20 applies a voltage to the lower transparent electrode and receives the voltage, made variable by the touched area.

The related art touch panel will now be explained in greater detail with reference to the sectional views described below.

Referring to FIGS. 2 to FIG. 5B, upper lower and upper PET substrates 1 and 2 are formed in a size and a shape corresponding to the display surface of the display device. Upper and lower transparent electrodes 3 and 4 made out of a transparent electrically conductive material, e.g., ITO, etc., are formed in each opposing surface of the upper and lower substrates 1 and 2.

Metal electrodes, e.g., silver (Ag) paste, are formed in the dead space region 20 of the upper and lower substrates. As shown in FIGS. 2 and 5A, metal electrodes 5a and 5b are formed in a dead space region 20 and connected to the upper transparent electrode 3 at the right and left sides of the upper substrate 1. Metal electrode 5b is electrically connected to metal electrode 5c formed in a dead space region 20 on lower or upper side of the upper transparent substrate 1. Metal electrode 5c is electrically insulated from the upper transparent electrode 3 by an insulating layer 10a but is electrically connected to FPC 7 via a conductive sealant 8a, as is metal electrode 5a.

As shown in FIGS. 2 and 5B, metal electrodes 6a and 6b formed in the dead space region 20 are connected to the lower transparent electrode 4 at lower and upper sides of the lower substrate 2. Metal electrodes 6a and 6b are also electrically connected metal electrode 6c formed in a dead space region 20 on the left side of the lower transparent substrate 2. Metal electrode 6c is electrically insulated from the lower transparent electrode 4 by an insulating layer 10b but is electrically connected to FPC 7 via a conductive sealant 8b.

FPC 7 acts as a signal line electrically connected to the metal electrodes 5(a and b) and 6(a and b) in the dead space region 20 by the metal electrodes 5(a and c) and 6c, respectively. Accordingly, two signal lines are printed on the upper and lower surfaces of the FPC 7 such that FPC 7 is electrically bonded to the metal electrodes 5*a*, 5*c* and 6*c* by the conductive sealants 8*a* or 8*b*. Accordingly, two signal lines printed on the upper surface of the FPC 7 are electrically bonded to the metal electrodes 5*a* and 5*c*, and two signal lines printed on the lower surface of the FPC 7 are electrically bonded to the metal electrode 6*c*.

As mentioned above, FPC 7 is electrically bonded to the metal electrodes 5*a*, 5*c* and 6*c* via the conductive sealant 8*a* and 8*b*, and the upper and lower substrates are bonded to each other via an insulating sealant 9 provided in all portions of the dead space region 20 except at the portion of the dead region occupied by FPC 7.

A method for electrically bonding the FPC 7 to the metal electrodes 5*a*, 5*c*, and 6*c* will now be explained in detail.

First, conductive sealant 8*a* and 8*b* is deposited on the metal electrodes 5*a*, 5*c*, and 6*c*. Next, the insulating sealant 9 is deposited in the dead space region 20 except for the portion of the dead region occupied by FPC 7. Subsequently, only the portion of the FPC 7 that is to be electrically connected to the metal electrodes 5*a*, 5*c*, and 6*c*, e.g., the portions of the FPC 7 on which the conductive sealant is formed, is heated at a temperature of approximately 100° C., and pressed to electrically connect the FPC 7 to the metal aforementioned metal electrodes. Through the electrical connection of the FPC 7 to the metal electrodes, the lower and upper transparent substrates are bonded to each other.

An operation of the touch panel will now be explained.

If the surface of the upper transparent substrate 1 is touched at the predetermined area with a pen or a finger, the upper and lower electrodes 3 and 4 become electrically connected to each other at the predetermined area.

Accordingly, a power supply voltage (Vcc) and a ground voltage (GND) are applied to the right and left sides of the upper transparent electrode 3 formed on the upper substrate 1 via the two signal lines formed on the upper surface of the FPC 7 and the metal electrode 5*a*, 5*b*, and 5*c*. A voltage, having a value made variable by the resistance value or the capacitance value specific to the touch point, is then outputted via the lower transparent electrode 4, the metal electrodes 6*a*, 6*b*, and 6*c*, and the two signal lines formed on the lower surface of the FPC 7, so that X-axis coordinates are detected.

Additionally, the power supply voltage Vcc and the ground voltage GND are also applied to the upper and lower sides of the lower transparent electrode 4 formed on the lower transparent substrate 2 via the two signal lines formed on the upper surface of the FPC 7 and the metal electrode 6*a*, 6*b*, and 6*c*. Then, the voltage value is then outputted at the touch point by the upper transparent electrode 3 and the metal electrodes 5*a*, 5*b*, and 5*c* of the upper substrate 1, so that the Y-axis coordinates are detected. Accordingly, the X-Y coordinates of the touch point may be detected.

However, the structure and method of operation of the aforementioned related art touch panel has the following problems.

First, when FPC 7 is electrically bonded to the various metal electrodes via the conductive sealant, the FPC is heated at a temperature of 100° C. At that temperature, the conductive sealant melts and deleteriously flows into the viewing area (V/A). Second, the upper and lower transparent electrodes formed on their respective substrates may electrically short at undesirable locations on the upper or lower transparent substrates due to the melting of the conductive sealant. Third, a contact failure occurs between the metal electrodes due to interference by the FPC.

SUMMARY OF THE INVENTION

Accordingly, the present invention is directed to a touch panel that substantially obviates one or more problems due to limitations and disadvantages of the related art.

An advantage of the present invention is to provide a touch panel in which one portion of a substrate is extended and bonded to a FPC, so that it is possible to prevent a conductive sealant from flowing into a viewing area even when a conductive sealant melts.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a touch panel includes first and second substrates facing to each other, wherein each substrate includes an extension at one side; first and second transparent electrodes provided on inner surface of each of the first and second substrates; and a signal line bonded to the first and second transparent electrodes at the extension, wherein the signal line applies a signal to each transparent electrode.

In one aspect of the present invention, metal electrodes may be connected to the first and second transparent electrodes for transmitting a signal from the signal line to a predetermined area of the first and second transparent electrodes.

In the present aspect, the metal electrodes may include first and second metal electrodes electrically connected to both sides of the first transparent electrode; third and fourth metal electrodes electrically connected to each of the first and second metal electrodes, wherein the third and fourth metal electrodes are extended to the extension; fifth and sixth metal electrodes electrically connected to lower and upper sides of the second transparent electrode; and seventh and eighth metal electrodes electrically connected to each of the fifth and sixth metal electrodes, wherein the seventh and eighth metal electrodes are extended to the extension.

In one aspect of the present invention, the touch panel may further include a conductive sealant for electrically bonding the signal line to the metal electrodes in a first region of the extension and an insulating sealant for bonding the first and second substrates to each other in a second region, different from the first region.

In another aspect of the present invention, the extension may be formed from an upper corner to a central portion of one side of each of the first and second substrates.

In another aspect of the present invention, a touch panel includes first and second substrates facing to each other, each having a viewing area, a dead space region surrounding the viewing area, and an extension at one side of the substrate; first and second transparent electrodes formed on each inner surface of the first and second substrates; metal electrodes on the first and second transparent electrodes in the dead space region and on the extension to be connected with the first and second transparent electrodes, respectively; and a signal line bonded to the metal electrodes at the extension.

In one aspect of the present invention, the touch panel may further include a conductive sealant for bonding the metal electrodes to the signal line at the extension and an insulating sealant for bonding the first and second substrates to each other in the dead space region.

In another aspect of the present invention, the metal electrodes may include first and second metal electrodes at both sides of the first transparent electrode in the dead space region so as to be electrically connected to the first transparent electrode; third and fourth metal electrodes in the dead space region so as to be respectively connected to the first and second metal electrodes, wherein the third and fourth metal electrodes are extended to the extension; fifth and sixth metal electrodes at lower and upper sides of the second transparent electrode in the dead space region so as to be electrically connected to the second transparent electrode; and seventh and eighth metal electrodes in the dead space region so as to be respectively connected to the fifth and sixth metal electrodes, wherein the seventh and eighth metal electrodes are extended to the extension.

In one aspect of the present invention, the unit signal line may include four lines, wherein two lines are connected to the third and fourth metal electrodes at the extension via the conductive sealant and two lines are connected to the seventh and eighth metal electrodes via the conductive sealant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
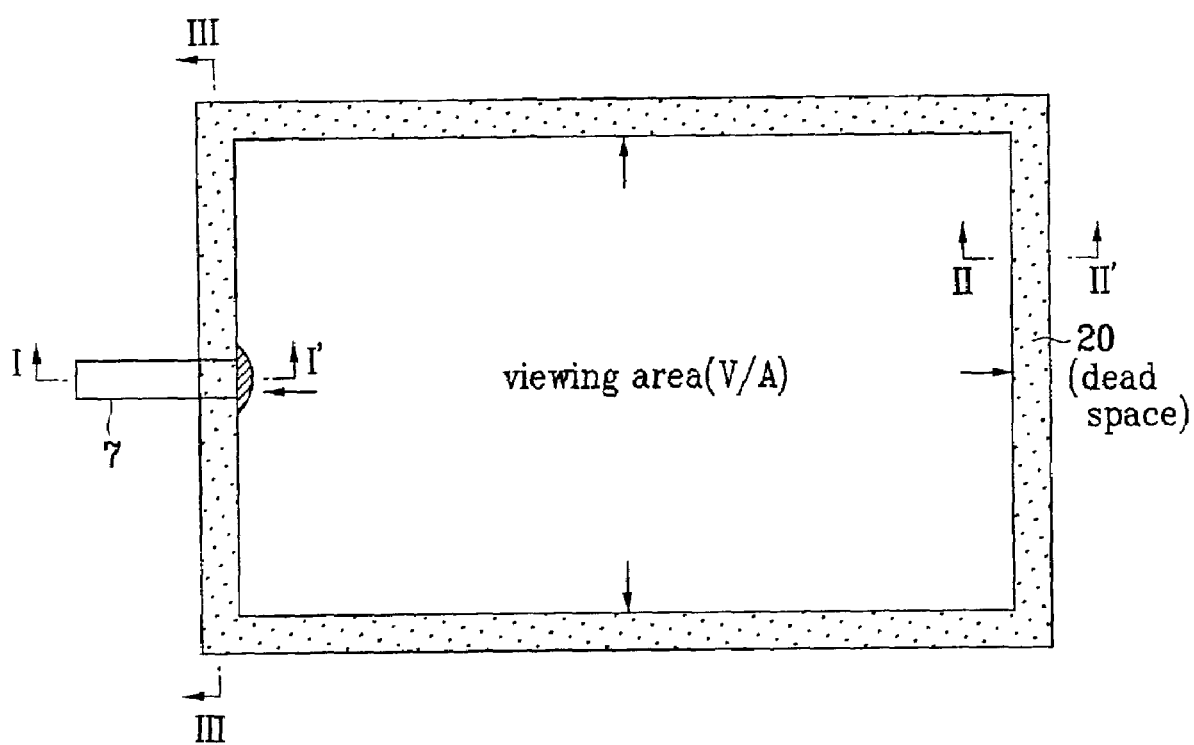
FIG. 1 illustrates a plane view of a related art touch panel capable of being integrated with an LCD.
Figure 2:
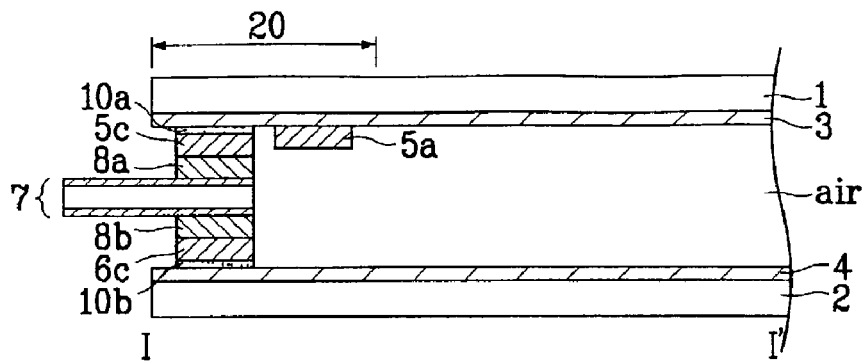
FIG. 2 illustrates a sectional view along line I–I' of the touch panel shown in FIG. 1.
Figure 3:
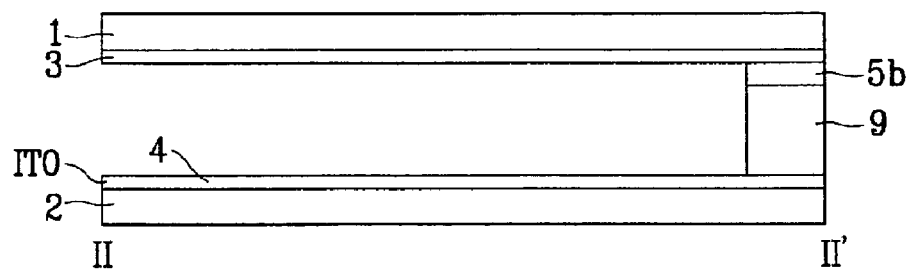
FIG. 3 illustrates a sectional view along line II–II' of the touch panel shown in FIG. 1.
Figure 4:
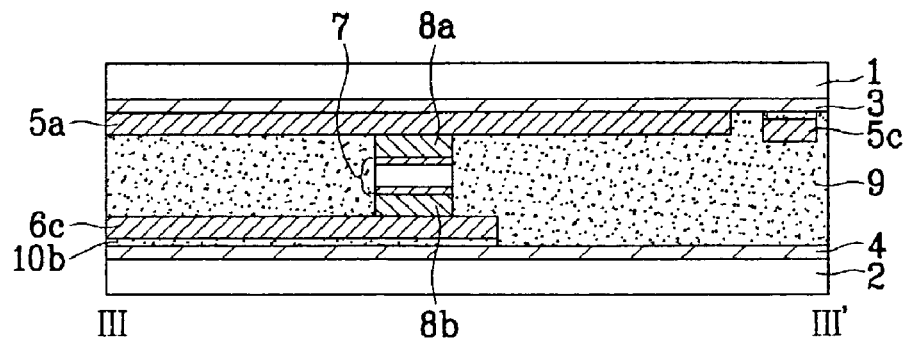
FIG. 4 illustrates a sectional view along line III–III' of the touch panel shown in FIG. 1.
Figure 5A:
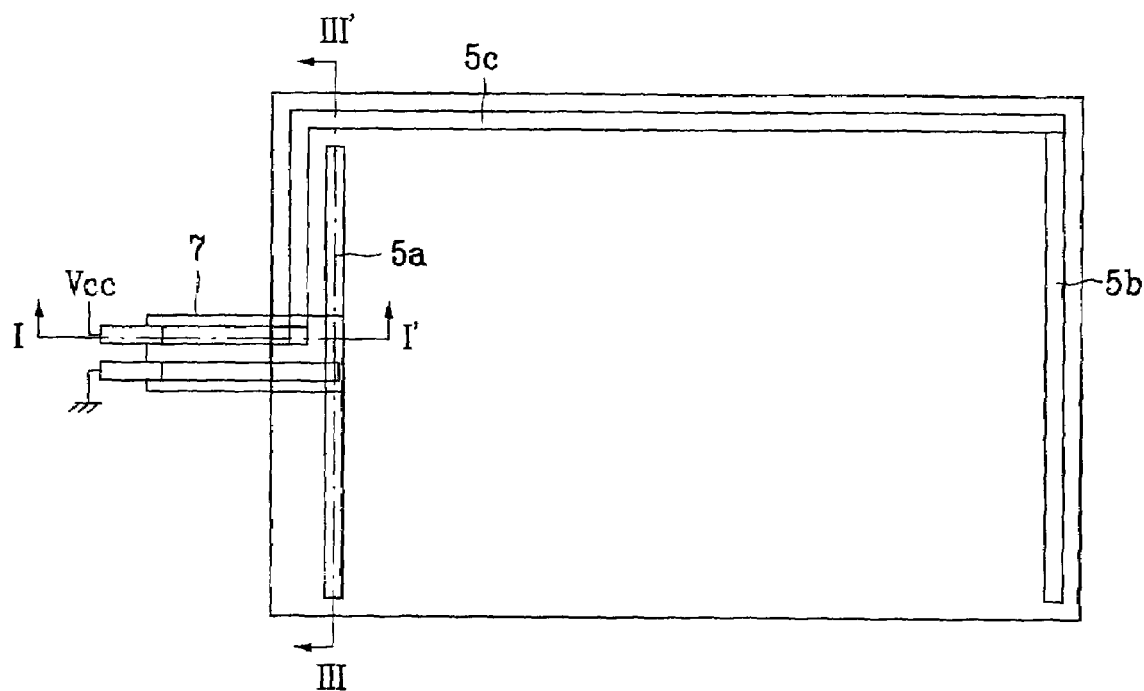
FIG. 5A illustrates a layout view of an upper substrate of the touch panel shown in FIG. 1.
Figure 5B:
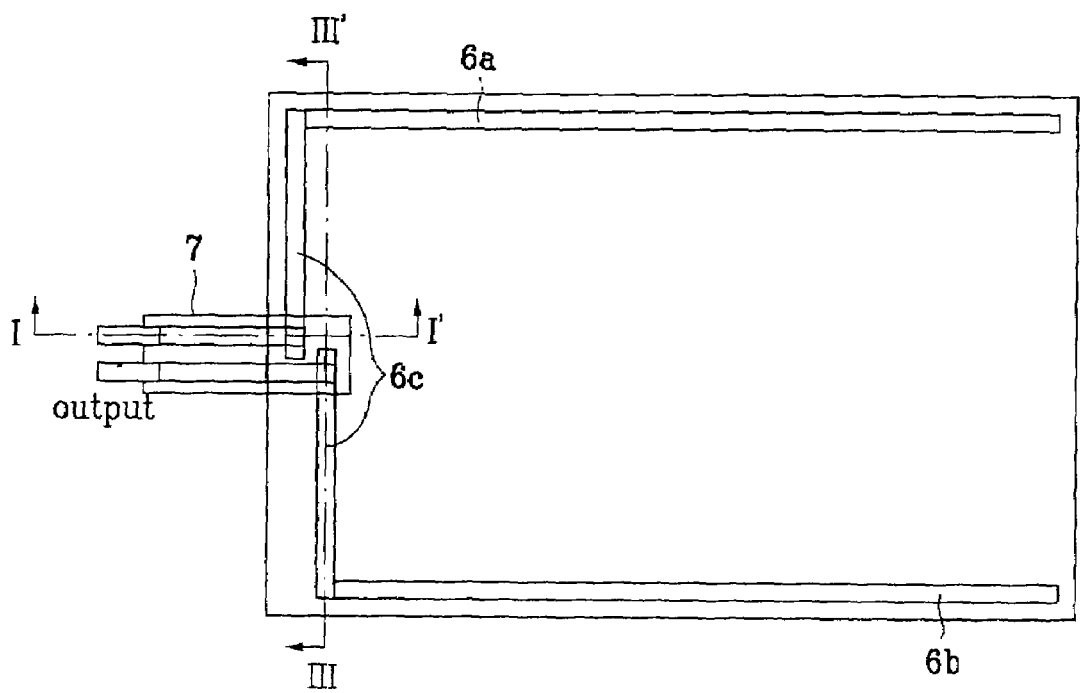
FIG. 5B illustrates a layout view of a lower substrate of the touch panel shown in FIG. 1.
Figure 6:
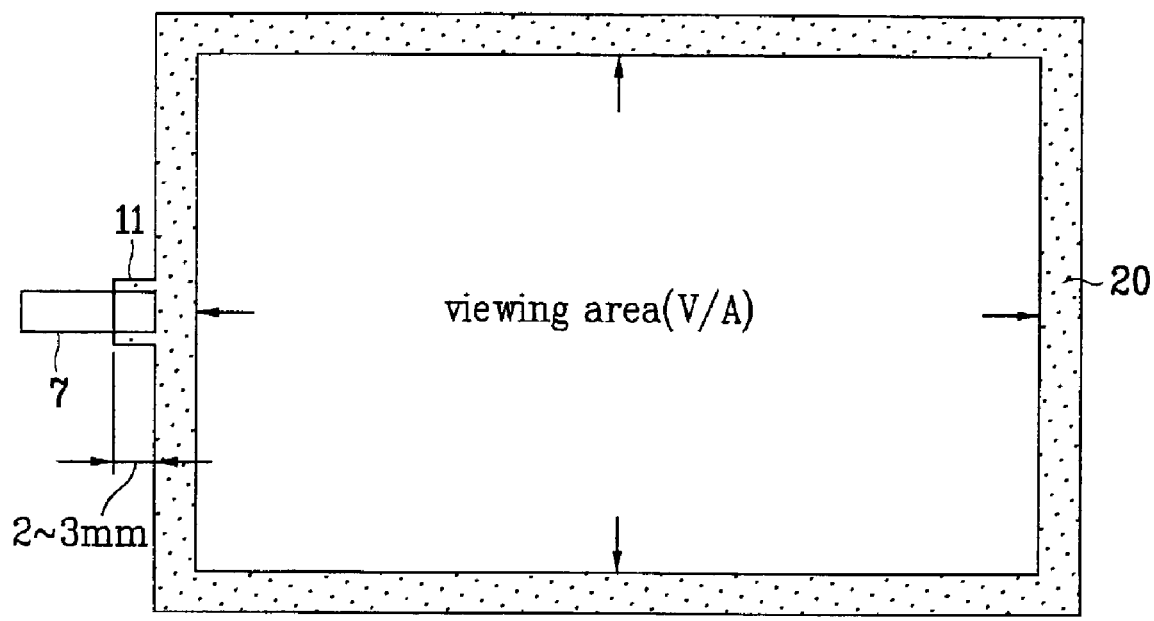
FIG. 6 illustrates a plane view of a touch panel capable of being integrated with a display device according to an embodiment of the present invention.
Figure 7A:
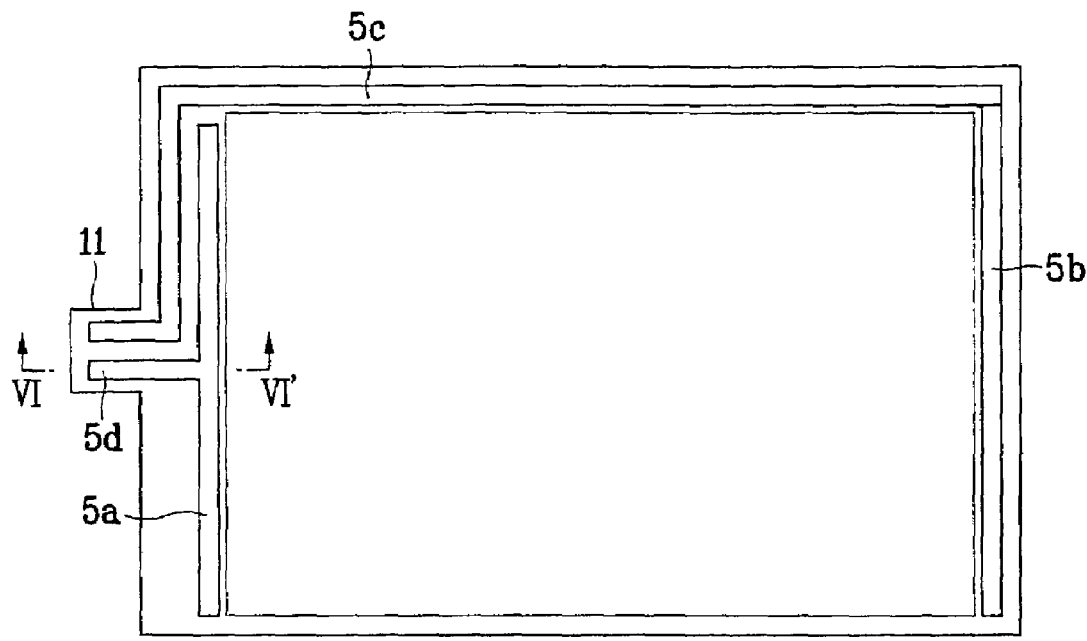
FIG. 7A illustrates a layout view of an upper substrate of the touch panel shown in FIG. 6.
Figure 7B:
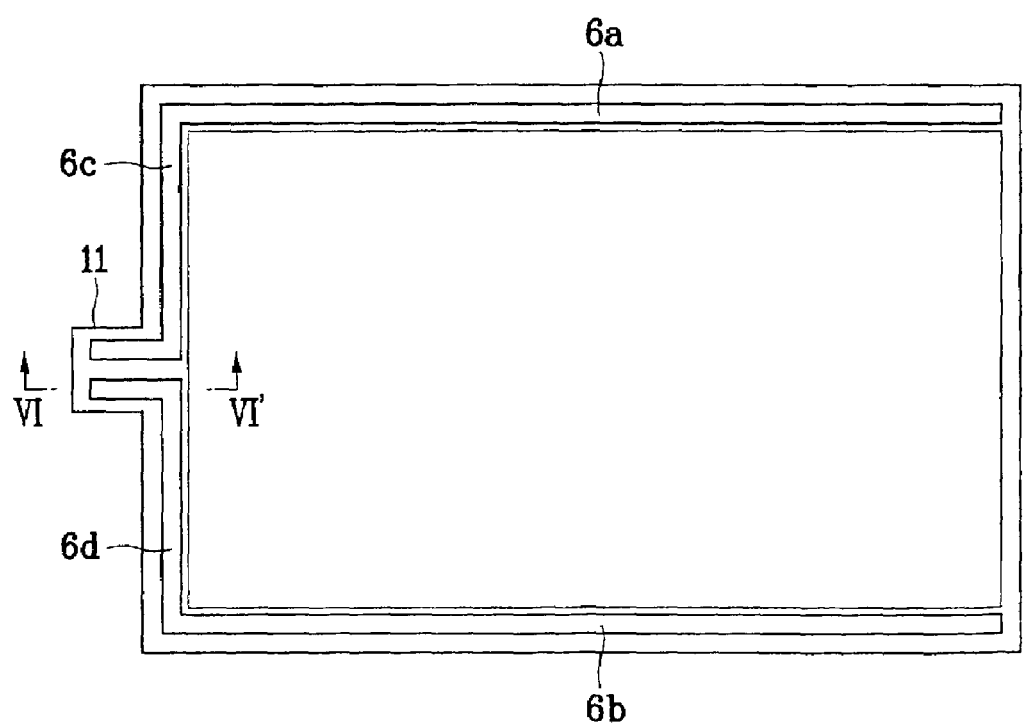
FIG. 7B illustrates a layout view of a lower substrate of the touch panel shown in FIG. 6.

Reference will now be made in detail to an embodiment of the present invention, examples of which are illustrated in the accompanying drawings. Wherever possible, the same reference numbers will be used throughout the drawings to refer to the same or like parts.

A touch panel according to an embodiment of the present invention will now be explained with reference to the aforementioned FIGS.

While generally referring to FIGS. 6, 7A, 7B, 8A and 8B, the touch panel according to the present embodiment may include upper and lower substrates 1 and 2 made of PET, for example, an extension 11 at a central portion on one side of each of the upper and lower substrates, and a flexible printed cable (FPC) 7 including a power supply line that may be connected to upper and lower transparent electrodes 3 and 4, respectively, 4 made out of a transparent electrically conductive material, e.g., ITO, etc., via the extension 11. Lower and upper substrates may be bonded to each other at a margin of the viewing area (V/A), i.e., dead space region 20, of the substrates except in regions at the extension 11 occupied by an insulating sealant.

The upper and lower substrates 1 and 2 have a shape and a size corresponding to the shape and size of a viewing area (V/A) of a display device, e.g., an LCD. The extension 11 may be formed in a dead space region 20 and may extend from the side of a display device, e.g., an LCD, with which the touch panel is to be integrated to a distance of about 2–3 mm. While it is illustrated that the extension may be formed at the central portion of the one side of the substrates, the extension may also be formed at any portion of one side of the substrates.

Referring to FIGS. 7A, 7B, 8A and 8B, upper and lower transparent electrodes 3 and 4 may be formed on the inner surfaces of the upper and lower substrates 1 and 2 in the viewing area (V/A) and in the dead space region 20. Metal electrodes 5a, 5b, 5c, 5d, 6a, 6b, 6c, and 6d may be formed in the dead space region including portions of the dead space region where the extension 11 is formed.

Metal electrodes 5a and 5b may be formed in the dead space region and be electrically connected to the upper transparent electrode 3 at the right and left sides of the upper substrate 1. Metal electrode 5c may be formed in the dead space region on an upper or lower side of the upper substrate 1 and where the extension 11 is formed. Metal electrode 5c may be electrically connected to metal electrode 5b while being electrically insulated from the upper transparent electrode 3 by an insulating layer 10a. Metal electrode 5d may be formed in the dead space region where the extension is formed and be electrically connected to the metal electrode 5a while being electrically insulated from the upper transparent electrode 3 by the insulating layer 10a.

Metal electrodes 6a and 6b may be formed in the dead space region on the upper and lower sides of the lower substrate 2 and may be electrically connected to the lower transparent electrode 4. Metal electrode 6c may be formed in the dead space region on an upper side of the lower substrate 2 and where the extension 11 is formed. Metal electrode 6c may be electrically connected to metal electrode 6a while being electrically insulated from the lower transparent electrode 4 via an insulating layer 10b. Metal electrode 6d may be formed in the dead space region on a lower side of the lower substrate 2 and where the extension is formed. Metal electrode 6d may be electrically connected to the metal electrode 6b while being electrically insulated from the lower transparent electrode 4 by the insulating layer 10b.

Figure 8A:
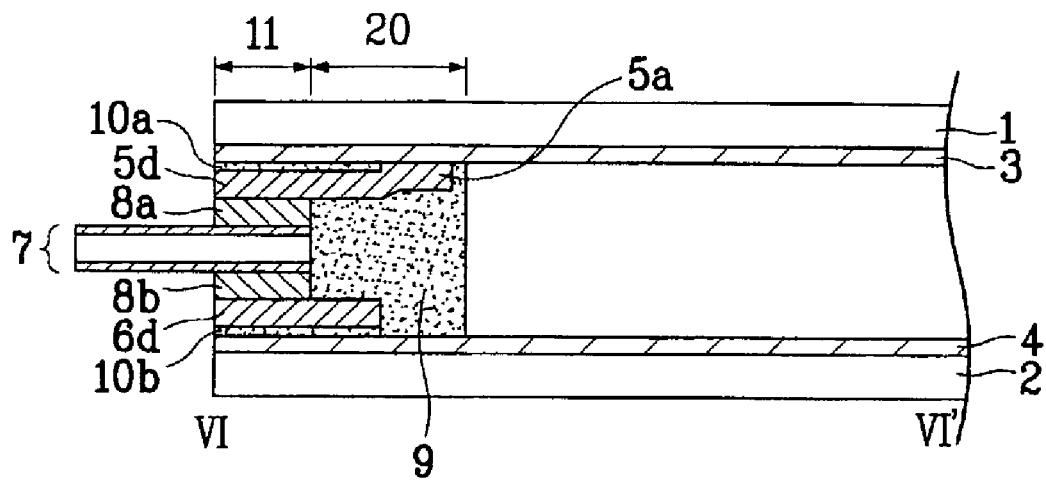
FIG. 8A illustrates a sectional along line IV–IV' of the touch panel shown in FIGS. 7A, and 7B.
Figure 8B:
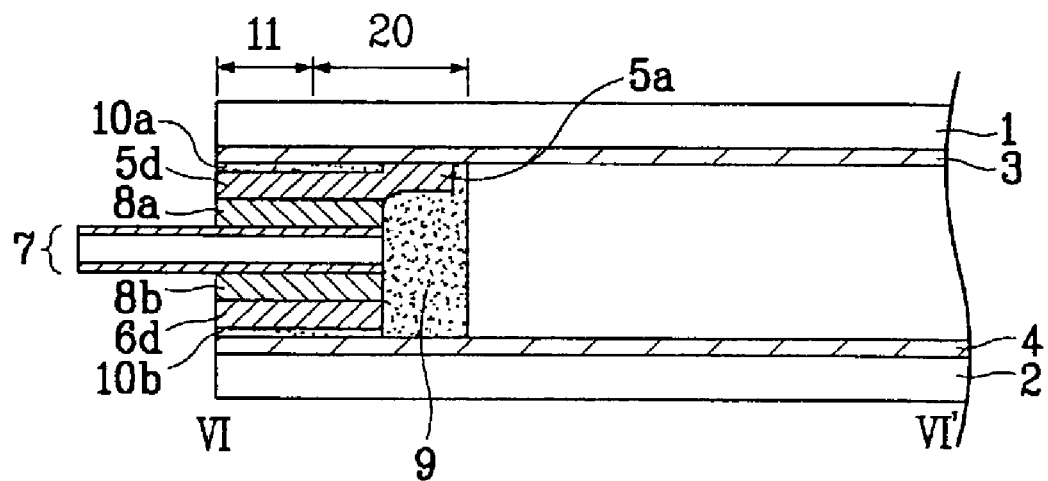
FIG. 8B illustrates another embodiment of FIG. 8A.

Referring to FIGS. 8A and 8B, flexible printed cable (FPC) 7 acts as a signal line that is electrically bonded to portions of metal electrodes 5c, 5d, 6c, and 6d found in the extension 11 via conductive sealants 8a or 8b. Also, the upper and lower substrates 1 and 2 may be bonded to each other in the dead space region 20 surrounding the viewing area (V/A) via an insulating sealant 9. The FPC 7 enters that dead space region 20 or overlaps with the dead space region partially with the FPC 7 in FIG. 8B but not in FIG. 8A.

When electrically bonding the FPC 7 to the various metal electrodes, the FPC is heated at an elevated temperature (e.g., about 100° C.) to melt the conductive sealant and bond the FPC to the various metal electrodes. As the conductive sealant melts, the insulating sealant 9 prevents both the deleterious flow of the conductive sealant into the viewing area and the electrical shorting of the upper and lower transparent electrodes 3 and 4 formed on the upper and lower substrates 1 and 2.

A touch panel according to another embodiment of the present invention will now be explained.

Figure 9:
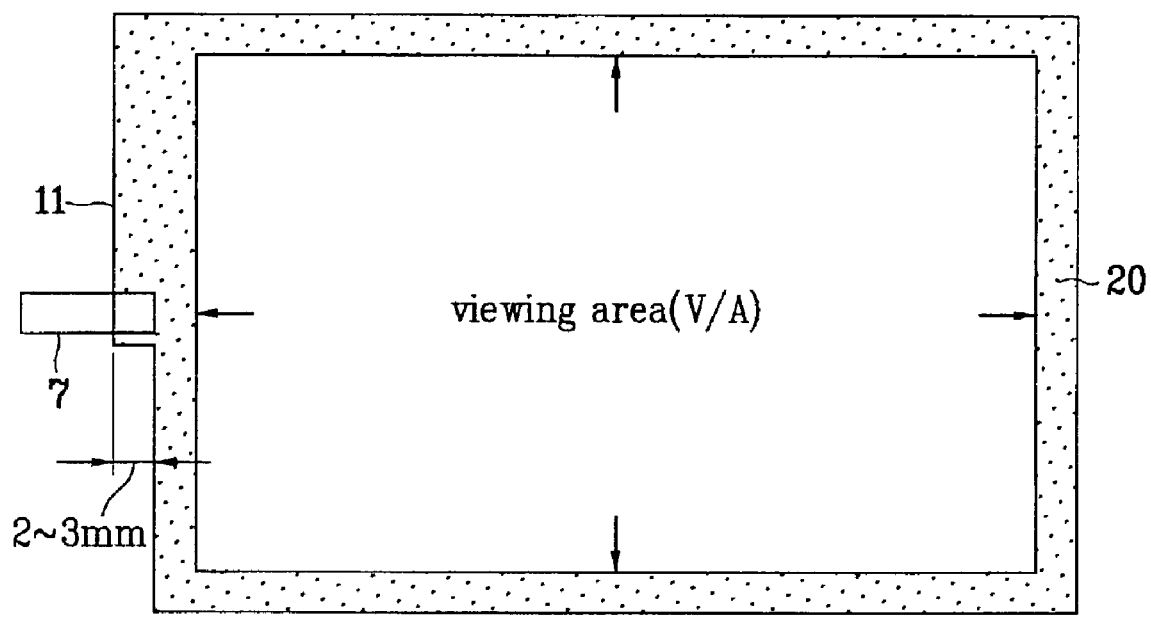
FIG. 9 illustrates a plane view of a touch panel capable of being integrated with a display device according to another embodiment of the present invention.
Figure 10:
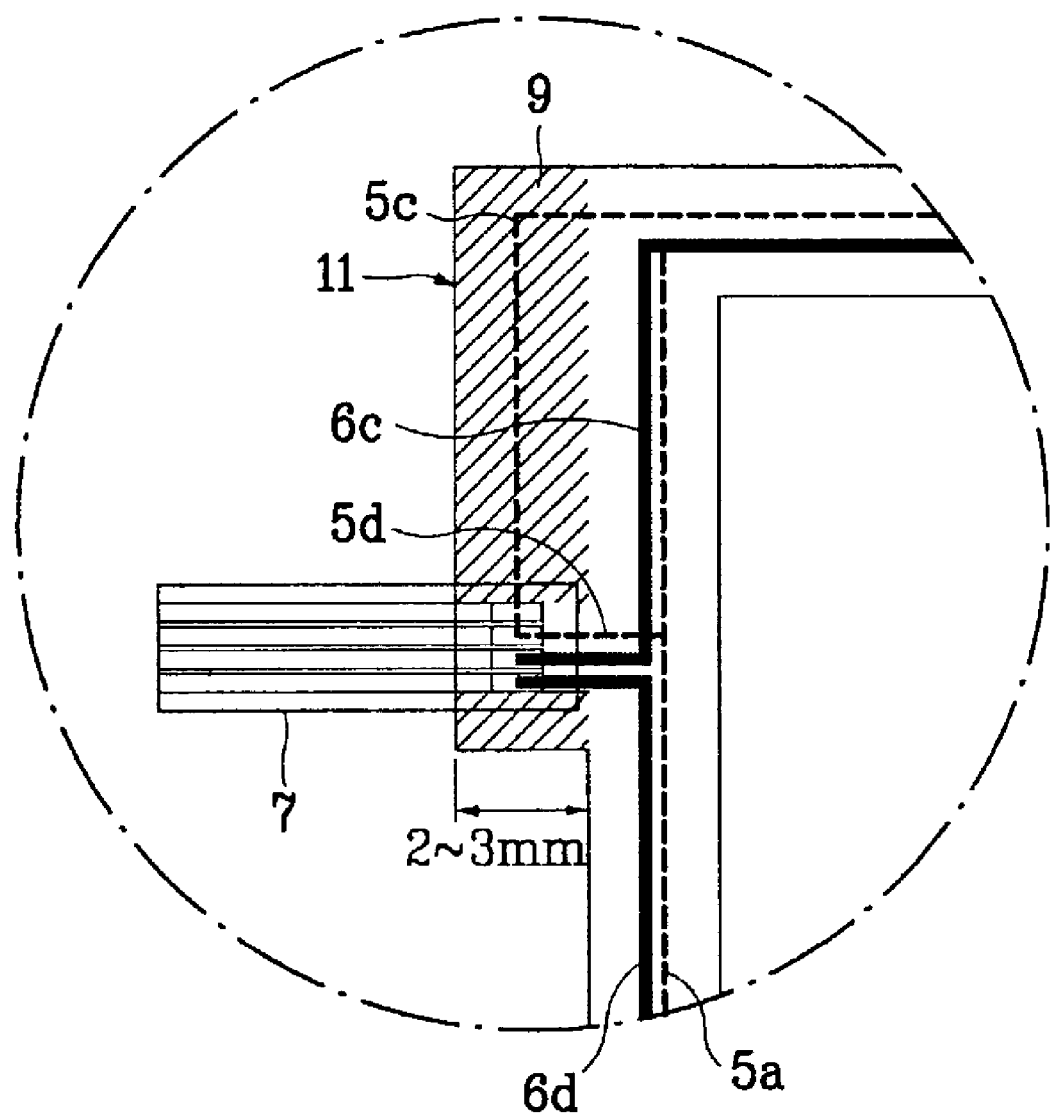
FIG. 10 illustrates an enlarged view showing an extension of the touch panel shown in FIG. 9.

FIG. 9 illustrates a plane view of a touch panel capable of being integrated with a display device according to another embodiment of the present invention. FIG. 10 illustrates an enlarged view showing an extension of the touch panel shown in FIG. 9.

While generally referring to FIG. 9, the touch panel according to the present embodiment may include upper and lower substrates 1 and 2, an extension 11 extending from an upper corner to a central portion on one side of each of the upper and lower substrates, and an FPC 7. The extension 11 may be formed in the dead space region 20 and extend from the side of a display device, e.g., an LCD, with which the touch panel is to be integrated to a distance of about 2–3 mm. Metal electrodes (not shown) may be electrically bonded to the FPC 7 at the extension 11 wherein the FPC 7 may act as a signal line.

Referring to FIG. 10, the FPC 7 may be bonded to the metal electrodes at a first region of the extension 11 via a conductive sealant. The upper and lower substrates may be bonded to each other at a second region of the extension 11 via an insulating sealant, wherein the second region is different than the first region. For example, the first region may be found at a central portion of one of the sides of the upper and lower substrates or in an upper corner of the extension 11 and the second region may be found in the dead space region 20 at the lower/upper/right/left sides of the upper and lower substrates.

As similarly described above with respect to FIGS. 7A, 7B, and 8, upper and lower transparent electrodes 3 and 4 may be formed on each of the inner surfaces of the upper and lower substrates 1 and 2 and metal electrodes 5a, 5b, 5c, 6a, 6b, and 6c may be formed in the dead space region 20 including the extension 11 of the upper and lower substrates 1 and 2 and on the upper and lower transparent electrodes 3 and 4.

Metal electrodes 5a and 5b may be formed in the dead space region 20 and may be electrically connected to the upper transparent electrode 3 on the right and left sides of the upper substrate 1. Metal electrode 5c may be formed in the dead space region on the upper or lower side of the upper substrate 1 and where the extension 11 is formed. Metal electrode 5c may be electrically connected to the metal electrode 5b while being electrically insulated from the upper transparent electrode 3 via an insulating layer 10a. Metal electrode 5d may be formed in the dead space region where the extension is formed and be electrically connected to the metal electrode 5a while being electrically insulated from the upper transparent electrode 3 via the insulating layer 10a.

Metal electrodes 6a and 6b may be formed in the dead space region and be electrically connected to the lower transparent electrode 4 at the lower and upper sides of the lower substrate 2. Metal electrode 6c may be formed in the dead space region on the upper side of the substrate and where the extension 11 is formed. Metal electrode 6c may be electrically connected to the metal electrode 6a while being electrically insulated from the lower transparent electrode 4 via an insulating layer 10b. Metal electrode 6d may be formed in the dead space region on a lower side of the lower substrate 2 and where the extension 11 is formed. Metal electrode 6d may be electrically connected to the metal electrode 6b while being electrically insulated from the lower transparent electrode 4 via the insulating layer 10b.

Flexible printed cable (FPC) 7 acts as a signal line that is electrically bonded to portions of metal electrodes 5c, 5d, 6c, and 6d found in the extension 11 via conductive sealants 8a or 8b. Also, the upper and lower substrates 1 and 2 may be bonded to each other in the dead space region 20 surrounding the viewing area (V/A) via an insulating sealant 9.

When electrically bonding the FPC 7 to the various metal electrodes, the FPC is heated at an elevated temperature to melt the conductive sealant and bond the FPC to the various metal electrodes. As the conductive sealant melts, the insulating sealant 9 prevents both the deleterious flow of the conductive sealant into the viewing area and the electrical shorting of the upper and lower transparent electrodes 3 and 4 formed on the upper and lower substrates 1 and 2. Additionally, the presence of the insulating sealant 9 prevents a contact failure from occurring between the metal electrodes due to interference by the FPC 7.

According to the present embodiment, the portions of the FPC 7 that are electrically bonded to the metal electrodes may be changed.

Figure 11:
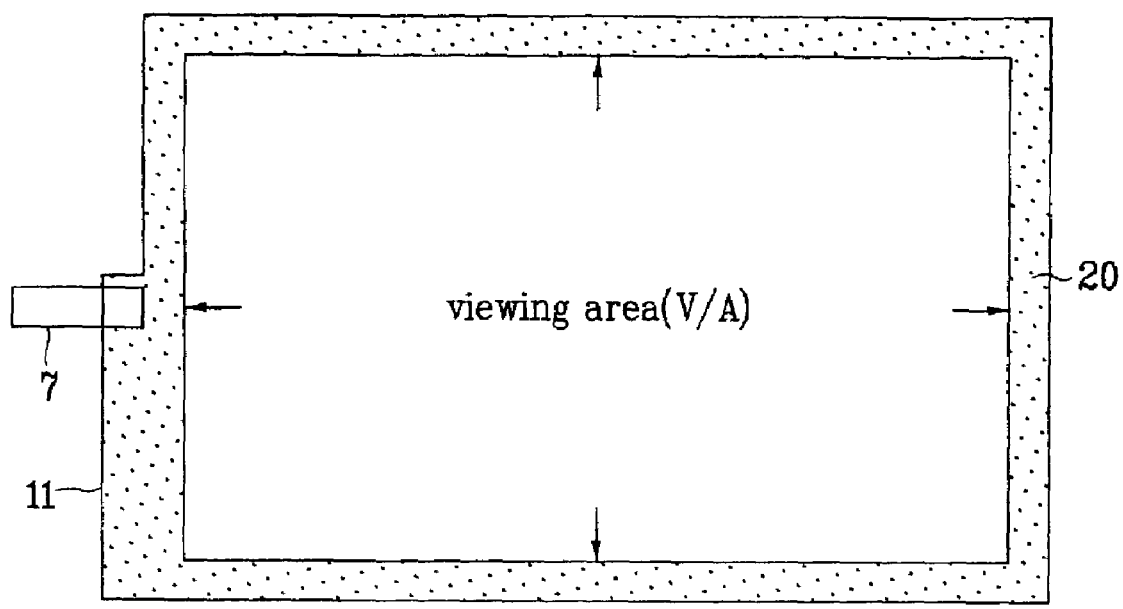
FIG. 11 illustrates a plane view of a touch panel capable of being integrated with a display device according to yet another embodiment of the present invention.

FIG. 11 illustrates a plane view of a touch panel capable of being integrated with an display device according to yet another embodiment of the present invention.

While generally referring to FIG. 11, the touch panel according to the present embodiment may include upper and lower substrates 1 and 2, an extension 11 extending from a lower corner to a central portion of one side of the upper and lower substrates (or in any other portion of one side of the substrates), and an FPC 7. The extension 11 may be formed in the dead space region 20 and extend from the side of a display device, e.g., an LCD, with which the touch panel is to be integrated to a distance of about 2–3 mm. Metal electrodes (not shown) may be electrically bonded to the FPC 7 acting as a signal line at the extension 11.

Referring to FIG. 11, the FPC 7 may be bonded to the metal electrodes at a first region of the extension 11 via a conductive sealant. The upper and lower substrates may be bonded to each other at a second region of the extension 11 via an insulating sealant, wherein the second region is different than the first region. For example, the first region may be found at a central portion of one of the sides of the upper and lower substrates or in an upper corner of the extension 11 and the second region may be found in the dead space region 20 at the lower/upper/right/left sides of the upper and lower substrates. Structures of the upper and lower transparent electrodes, metal electrodes, insulating layers, conductive sealants, insulating sealants, etc., found in the touch panel of the present embodiment are similarly provided as those described in the aforementioned embodiments.

Figure 12:
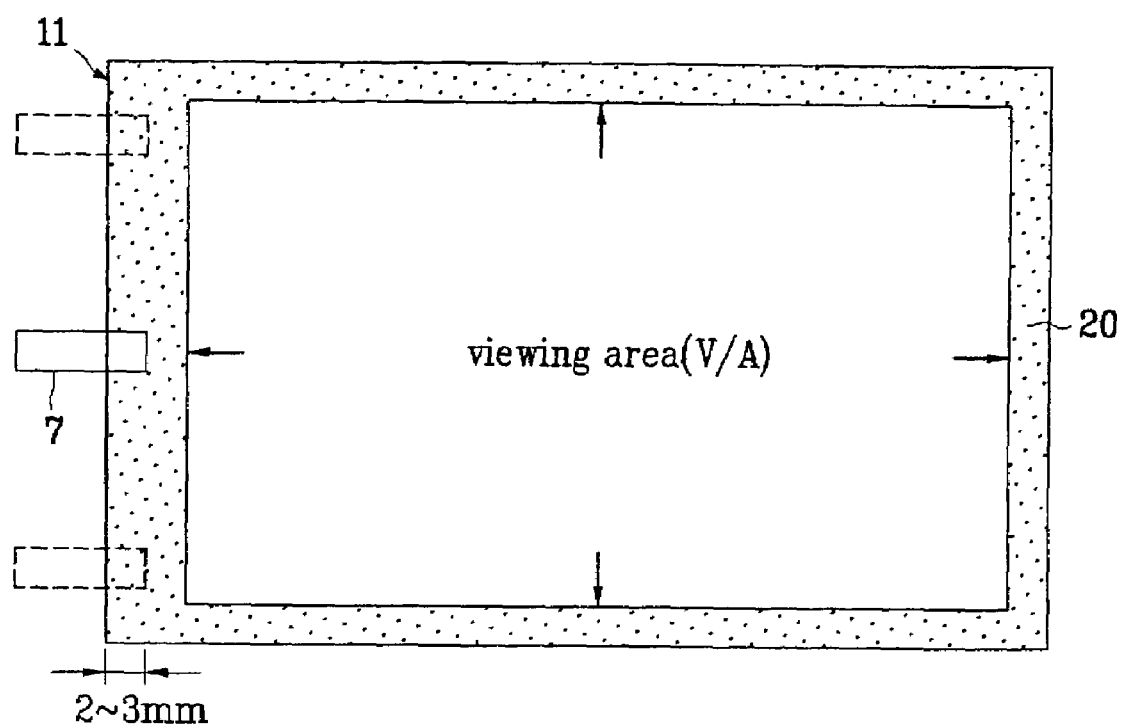
FIG. 12 illustrates a plane view of a touch panel capable of being integrated with a display device according to still another embodiment of the present invention.

FIG. 12 illustrates a plane view of a touch panel capable of being integrated with a display device according to still another embodiment of the present invention.

While generally referring to FIG. 12, the touch panel according to the present embodiment includes lower and upper substrates 2 and 1, an extension 11 extending from an upper corner to a lower corner of one side of the upper and lower substrates, and an FPC 7. The extension 11 may be formed in the dead space region 20 and extend from the side of a display device, e.g., an LCD, with which the touch panel is to be integrated to a distance of about 2–3 mm. Metal electrodes (not shown) may be electrically bonded to the FPC 7 acting as a signal line at the extension 11.

Referring to FIG. 12, the FPC 7 may be bonded to the metal electrodes at a first region of the extension 11 via a the conductive sealant. The upper and lower substrates may be bonded to each other at a second region of the extension 11 via an insulating sealant, wherein the second region is different than the first region. For example the first region may be found at an upper, central, or lower portion (or any portions therebetween) of the extension 11 and the second region may be found in the dead space region 20 at the lower/upper/right/left sides of the upper and lower substrate. Structures of the upper and lower transparent electrodes, metal electrodes, insulating layers, conductive sealants, insulating sealants, etc., found in the touch panel of the present embodiment are similarly provided as those described in the aforementioned embodiments.

The touch panel capable of being integrated with a display device disclosed herein has the following advantages.

First, an extension may be formed at a predetermined location of one side of the upper and lower substrate where and signal lines may be connected to metal electrodes. Even though conductive sealant material, used to electrically bond signal lines metal electrodes, melts during a bonding process, the deleterious flow of the conductive sealant into the viewing area and the electrical shorting of transparent electrodes formed on substrates may be prevented.

Furthermore, the signal line may be connected to the metal electrode at the extension, thereby simplifying the process steps, increasing process tolerances, and improving a fabrication yield.

Finally, when the signal lines from the FPC are bonded to the metal electrodes at the extension, the extension may be enlarged and the lower and upper substrates may be bonded to each other via an insulating sealant everywhere within the extension except the at the portion where the signal lines are bonded. Accordingly, it is possible to prevent a contact failure from generating due to FPC interference during bonding.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch panel comprising:
   first and second opposing substrates, each substrate having an extension formed at one side, and each substrate having a dead space area and a viewing area;
   first and second transparent electrodes formed on surfaces of the first and second substrates facing each other;
   a first signal transmitting metal electrode connected to the first transparent electrode;
   a second signal transmitting metal electrode connected to the second transparent electrode;
   a signal line for applying a signal to each transparent electrode,
   a conductive sealant for electrically bonding the signal line to the first signal transmitting metal electrode and the second signal transmitting metal electrode in the extension; and
   an insulating sealant for bonding the first and second substrates to each other,
   wherein the conductive sealant has a melting point that is below a melting point of the insulating sealant, and wherein the insulating sealant and extension prevent the conductive sealant from flowing into the viewing area when the signal line is bonded to the first signal transmitting metal electrode and the second signal transmitting metal electrode.

2. The touch panel as claimed in claim 1, wherein the melting point of the conductive sealant is approximately 100° C.

3. The touch panel as claimed in claim 1, wherein the first signal transmitting metal electrode comprises:
   first and second metal electrodes electrically connected to opposite sides of the first transparent electrode; and
   third and fourth metal electrodes electrically connected to each of the first and second metal electrodes, wherein at least a portion of the third and fourth metal electrodes are located in the extension.

4. The touch panel as claimed in claim 3, wherein the second signal transmitting metal electrode comprises:
   fifth and sixth metal electrodes electrically connected to lower and upper sides of the second transparent electrode; and
   seventh and eighth metal electrodes electrically connected to each of the fifth and sixth metal electrodes, wherein at least a portion of the seventh and eighth metal electrodes are located in the extension.

5. The touch panel as claimed in claim 1, wherein the extension is formed at a central portion of one side of each of the first and second substrates.

6. The touch panel as claimed in claim 1, wherein the extension is formed from an upper corner to a central portion of one side of each of the first and second substrates.

7. The touch panel as claimed in claim 6, wherein the extension comprises first and second regions, wherein the first region includes the conductive sealant, and wherein the second region includes the insulating sealant.

8. The touch panel as claimed in claim 1, wherein the extension is formed from an upper corner to a lower corner of one side of each of the first and second substrates.

9. The touch panel as claimed in claim 8, wherein the extension comprises first and second regions, wherein the first region includes the conductive sealant, and wherein the second region includes the insulating sealant.

10. A touch panel comprising:
    first and second opposing substrates, wherein each of the first and second substrates includes a viewing area, a dead space region surrounding the viewing area, and an extension formed at one side of the substrate;
    first and second transparent electrodes formed on surfaces of the first and second substrates facing each other;
    metal electrodes connected to the first and second transparent electrodes in the dead space region and formed on the extension;

a signal line bonded to the metal electrodes at the extension;

a conductive sealant for bonding the metal electrodes to the signal line in the extension; and an insulating sealant for bonding the first and second substrates to each other in the dead space region, wherein the conductive sealant has a melting point that is below a melting point of the insulating sealant, and wherein the insulating sealant and extension prevent the conductive sealant from flowing into the viewing area when the signal line is bonded to the metal electrodes.

11. The touch panel as claimed in claim 10, wherein the melting point of the conductive sealant is approximately 100° C.

12. The touch panel as claimed in claim 10, wherein the metal electrodes comprise:

first and second metal electrodes electrically connected to the first transparent electrode and provided at opposite sides of the first transparent electrode in the dead space region;

third and fourth metal electrodes provided in the dead space region and connected to the first and second metal electrodes, respectively, the third and fourth metal electrodes located in the extension;

fifth and sixth metal electrodes electrically connected to the second transparent electrode and provided at lower and upper sides of the second transparent electrode in the dead space region; and seventh and eighth metal electrodes provided in the dead space region and connected to the fifth and sixth metal electrodes, respectively, the seventh and eighth metal electrodes being located in the extension.

13. The touch panel as claimed in claim 12, wherein the signal line comprises four lines, wherein two lines are connected to the third and fourth metal electrodes in the extension via the conductive sealant, and two lines are connected the seventh and eighth metal electrodes by the conductive sealant.

14. The touch panel as claimed in claim 10, wherein the extension is formed at a central portion of one side of each of the first and second substrates.

15. The touch panel as claimed in claim 10, wherein the extension is formed from an upper corner to a central portion of one side of each of the first and second substrates.

16. The touch panel as claimed in claim 15, wherein the extension comprises first and second regions, the second region being different than the first region, wherein the signal line is bonded in the first region, and the first and second substrates are bonded to each other at the second region.

17. The touch panel as claimed in claim 10, wherein the extension is formed from an upper corner to a lower corner of one side of each of the first and second substrates.

18. The touch panel as claimed in claim 17, wherein the extension comprises first and second regions, the second region being different than the first region, wherein the signal line is bonded in the first region, and the first and second substrates are bonded to each other at the second region.

19. The touch panel as claimed in claim 10, wherein the extension extends past a display device with which the touch panel is to be integrated by a distance of about 2 mm to 3 mm.

20. The touch panel as claimed in claim 19, wherein the display device comprises an LCD device.

* * * * *